(12) United States Patent
Takahashi et al.

(10) Patent No.: US 8,754,995 B2
(45) Date of Patent: Jun. 17, 2014

(54) LIQUID-CRYSTAL DISPLAY DEVICE

(75) Inventors: Hiroki Takahashi, Kanagawa (JP); Yoji Nagase, Kanagawa (JP)

(73) Assignee: Sony Corporation, Tokyo (JP)

( * ) Notice: Subject to any disclaimer, the term of this patent is extended or adjusted under 35 U.S.C. 154(b) by 1153 days.

(21) Appl. No.: 12/579,182

(22) Filed: Oct. 14, 2009

(65) Prior Publication Data

US 2010/0091211 A1 Apr. 15, 2010

(30) Foreign Application Priority Data

Oct. 15, 2008 (JP) .................................. P2008-266251

(51) Int. Cl.
*G02F 1/1343* (2006.01)

(52) U.S. Cl.
USPC ............................................. 349/39; 349/147

(58) Field of Classification Search
USPC ................................ 349/38, 39, 139, 147, 148
See application file for complete search history.

(56) References Cited

U.S. PATENT DOCUMENTS

| | | | |
|---|---|---|---|
| 4,582,395 A | 4/1986 | Morozumi | |
| 6,052,162 A * | 4/2000 | Shimada et al. | 349/38 |
| 6,903,793 B2 | 6/2005 | Kaneko et al. | |
| 7,564,529 B2 * | 7/2009 | Ahn | 349/141 |
| 7,586,121 B2 * | 9/2009 | Sun | 257/59 |
| 2006/0290855 A1 * | 12/2006 | Itoh et al. | 349/123 |
| 2008/0013026 A1 | 1/2008 | Choi et al. | |

FOREIGN PATENT DOCUMENTS

| | | |
|---|---|---|
| JP | H01-33833 | 7/1989 |
| JP | H04-217230 | 8/1992 |
| JP | 532378 | 12/1993 |
| JP | 09-096837 | 4/1997 |
| JP | 10-020331 | 1/1998 |
| JP | 10-096949 | 4/1998 |
| JP | 11-352525 | 12/1999 |
| JP | 2000-101091 | 4/2000 |
| JP | 2001-194676 | 7/2001 |
| JP | 2006-195098 | 7/2006 |
| JP | 2007-248667 | 9/2007 |
| JP | 2008-15511 | 1/2008 |

* cited by examiner

*Primary Examiner* — Edward Glick
*Assistant Examiner* — David Chung
(74) *Attorney, Agent, or Firm* — Finnegan Henderson Farabow Garrett & Dunner, LLP

(57) ABSTRACT

A liquid-crystal display includes scan lines arranged on a substrate and also functioning as a gate of a thin-film transistor, a main line arranged between the scan lines, source lines arranged in a direction intersecting the scan lines, a picture-element electrode arranged between the source lines and between the scan lines, a storage capacitor formed with the main line, an insulation layer, and an intermediate electrode, a drain line connected to a drain of the thin-film transistor and the intermediate electrode. The main line includes a first transparent electrode and a first metallic line, which is formed on the first transparent electrode, is narrower and has a lower resistance than the first transparent electrode. The drain line includes a second transparent electrode and a second metallic line which is narrower and has a lower resistance than the second transparent electrode. The intermediate electrode is formed by extending the second transparent electrode.

5 Claims, 13 Drawing Sheets

LIQUID-CRYSTAL DISPLAY DEVICE

BACKGROUND OF THE INVENTION

1. Field of the Invention

The invention relates to a liquid-crystal display device.

2. Description of the Related Art

For a liquid-crystal display device of the related art, for example, FIG. 13 showing a planar layout diagram and FIG. 14 showing a cross-section diagram taken along XIV-XIV in FIG. 13 illustrate a structure of a pixel section which is formed in an active-matrix substrate and provided with a storage capacitor element (also called a retentive capacitive element or auxiliary capacitive element).

In the examples of FIG. 13 and FIG. 14, a storage capacitor element 230 in the liquid-crystal display device has an inversely-staggered structure. First, a scan line 212 also functioning as a gate electrode of a thin-film transistor (TFT) is formed with low-resistance metal material such as aluminum on a glass substrate 211. Usually, from a productivity standpoint, a main wiring line 213 used for a storage capacitor element ($C_S$) and the scan line 212 also functioning as the gate electrode of the thin-film transistor are simultaneously formed with a same metal material layer. A gate insulation layer 214 is formed on the gate electrode 212 (212G) and the main wiring line 213 used for a storage capacitor element ($C_S$). The gate insulation layer 214 is formed with a silicon nitride layer. Then, an active element 215, a source wiring line 216, and a drain wiring line 217 are formed in the TFT section, and for the TFT section, a passivation layer 218, an overcoat layer 219, and a picture-element electrode 220 are formed. The source wiring line 216 and drain wiring line 217 are formed with a low-resistance metal material such as, for example, aluminum or aluminum alloy. The passivation layer 218 is formed with, for example, a silicon nitride layer, the overcoat layer 219 is formed with, for example, an acrylic resin, and the picture-element electrode 220 is formed with a transparent electrode (see, for example, Japanese Examined Patent Application Publication No. H01-33833).

Typically, the storage capacitor element ($C_S$) includes the main wiring line 213, an intermediate electrode 221 formed by extending the drain electrode 217 from the TFT, and a gate insulation layer 214 formed between the main wiring line 213 and the intermediate electrode 221. The intermediate electrode 221 contacts the picture-element electrode 220 through a contact hole 222 formed in the passivation layer 218 and overcoat 219. In this case, since the main wiring line 213 and intermediate electrode 221 are respectively formed with low-resistance metal layers which are the same layers as the gate electrode 212 (212G) and drain wiring line 217, light from a backlight source is blocked and thus an aperture ratio decreases (see, for example, Japanese Unexamined Patent Application Publication No. H04-217230). When the intermediate electrode 221 is not used, a storage capacitor is directly formed between the picture-element electrode 220 and gate electrode 212 (212G). In this case, as previously described, the main wiring line 213 which is a low-resistance metal layer also makes an aperture ratio decrease.

In addition, as a method for improving viewing-angle characteristics, there is another method called "capacitive-coupling halftone grayscale method" (hereinafter referred to as "halftone method").

In a Multidomain Vertical Alignment type or Twisted Nematic type liquid-crystal display device of the related art, there arises a phenomenon that its display screen becomes white-tinged when viewed from an oblique direction. When a voltage which is somewhat higher than a threshold voltage is applied to the picture-element electrode 220, a transmittance of the display screen viewed from an oblique direction becomes higher than that of the display screen viewed from an anterior direction. In addition, when the applied voltage becomes a certain higher level, a transmittance of the display screen viewed from an oblique direction becomes lower than that of the display screen viewed from an anterior direction. Therefore, small luminance-differences among a red pixel, a green pixel, and a blue pixel result in the aforementioned phenomenon that the display screen becomes white-tinged.

In the halftone method, as a countermeasure against the phenomenon, a pixel is divided into a plurality of sub-pixels which are capacitively coupled to one another. Since an electric potential is divided on the basis of a capacitance ratio of each sub-pixel, mutually-different voltages can be applied to the plurality of sub-pixels, respectively. Therefore, as a result, one pixel appears to have a plurality of areas which have different threshold voltages of transmittance vs. voltage characteristics (T-V characteristics). When, in this way, there are the plurality of areas in one pixel, which have different threshold voltages of the T-V characteristics, averaged T-V characteristics among these areas suppresses the phenomenon that a transmittance of the display screen viewed from an oblique direction becomes higher than that of the display screen viewed from an anterior direction. As a result, the phenomenon that the display screen becomes white-tinged when viewed from an oblique direction is also suppressed.

A structural example of the halftone method will be described with reference to FIG. 15 showing a planar layout diagram, FIG. 16A showing a cross-section diagram taken along XVIA-XVIA in FIG. 15, and FIG. 16B showing a cross-section diagram taken along XVIB-XVIB in FIG. 15.

As shown in FIGS. 15, 16A, and 16B, an outline of the structure is the same as that explained using FIG. 13. For example, a main wiring line 213 used for a storage capacitor element ($C_S$) and the scan line 212 also functioning as a gate electrode of the thin-film transistor are simultaneously formed with the same metal material layer. A gate insulation layer 214 is formed on the gate electrode 212 (212G) and the main wiring line 213 used for a storage capacitor element ($C_S$). The gate insulation layer 214 is formed with a silicon nitride layer. Then, an active element 215, a source wiring line 216, and a drain wiring line 217 are formed in the TFT section, and for the TFT section, a passivation layer 218 and a picture-element electrode 220 are formed. The source wiring line 216 and drain wiring line 217 are formed with a low-resistance metal material such as, for example, aluminum or aluminum alloy. The passivation layer 218 is formed with, for example, a silicon nitride layer, the overcoat layer 219 is formed with, for example, an acrylic resin, and the picture-element electrode 220 is formed with a transparent electrode. The picture-element electrode 220 is divided into a picture-element electrode 220A and a picture-element electrode 220B. The picture-element electrode 220B is connected to the drain wiring line 217 with the same structure as explained using FIG. 13. On the other hand, the picture-element electrode 220A is capacitively coupled to the drain wiring line 217. For the capacitive coupling, a control electrode 223 is formed in the middle of the drain wiring line 217, and an area of a certain size is arranged for determining a voltage value of each selected picture element. In the same way as previously mentioned, the drain wiring line 217 and control electrode 223, formed simultaneously with a low-resistance metal layer of same material, have a light-blocking effect and make an aperture ratio decrease.

SUMMARY OF THE INVENTION

It is desirable to ensure provision of storage capacitance and a high aperture ratio.

By using a layer structure of a transparent electrode and a metallic electrode, an embodiment of the invention enables an aperture ratio to become high while ensuring provision of storage capacitance.

According to an embodiment of the present invention, there is provided a liquid-crystal display device, including a plurality of scan lines arranged in a first direction on a substrate and also functioning as a gate electrode, a storage-capacitor main wiring line arranged between the plurality of scan lines on the substrate in a direction that is parallel to the first direction, a plurality of source wiring lines arranged in a second direction intersecting the first direction, a thin-film transistor including the gate electrode, a picture-element electrode arranged between the plurality of source wiring lines and between the plurality of scan lines, a storage capacitor formed by using the storage-capacitor main wiring line, an insulation layer on the storage-capacitor main wiring line, and an intermediate electrode on the insulation layer, and a drain wiring line connected to a drain electrode of the thin-film transistor and the intermediate electrode;

wherein the storage-capacitor main wiring line includes a first transparent electrode and a first metallic wiring line formed on the first transparent electrode, the first metallic wiring line being smaller in width and having a lower electrical resistance than the first transparent electrode, the drain wiring line includes a second transparent electrode and a second metallic wiring line being smaller in width and having a lower electrical resistance than the second transparent electrode, and the intermediate electrode is formed by extending the second transparent electrode.

In the liquid-crystal display device according to an embodiment of the present invention, the storage-capacitor main wiring line includes the first transparent electrode and the first metallic wiring line which is smaller in width and has a lower electrical resistance than the first transparent electrode. Therefore, a portion of the first transparent electrode, not covered with the first metallic wiring line, enables an aperture ratio of a picture element to become high. Furthermore, an ensured area of the first transparent electrode keeps a capacitance value of the storage capacitor from decreasing, the storage capacitor being formed by using the storage-capacitor main wiring line and the intermediate electrode. In addition, since the first metallic wiring line is formed on the first transparent electrode, increase of wiring resistance is suppressed.

According to an embodiment of the present invention, there is provided a liquid-crystal display device which enables an aperture ratio to become high while ensuring provision of storage capacitance and, as a result, enables luminance and contrast to become high.

DETAILED DESCRIPTION OF THE PREFERRED EMBODIMENTS

Hereinafter, preferred embodiments of the present invention will be described.

First Embodiment

First Configuration Example of Liquid-Crystal Display Device

Figure 1:
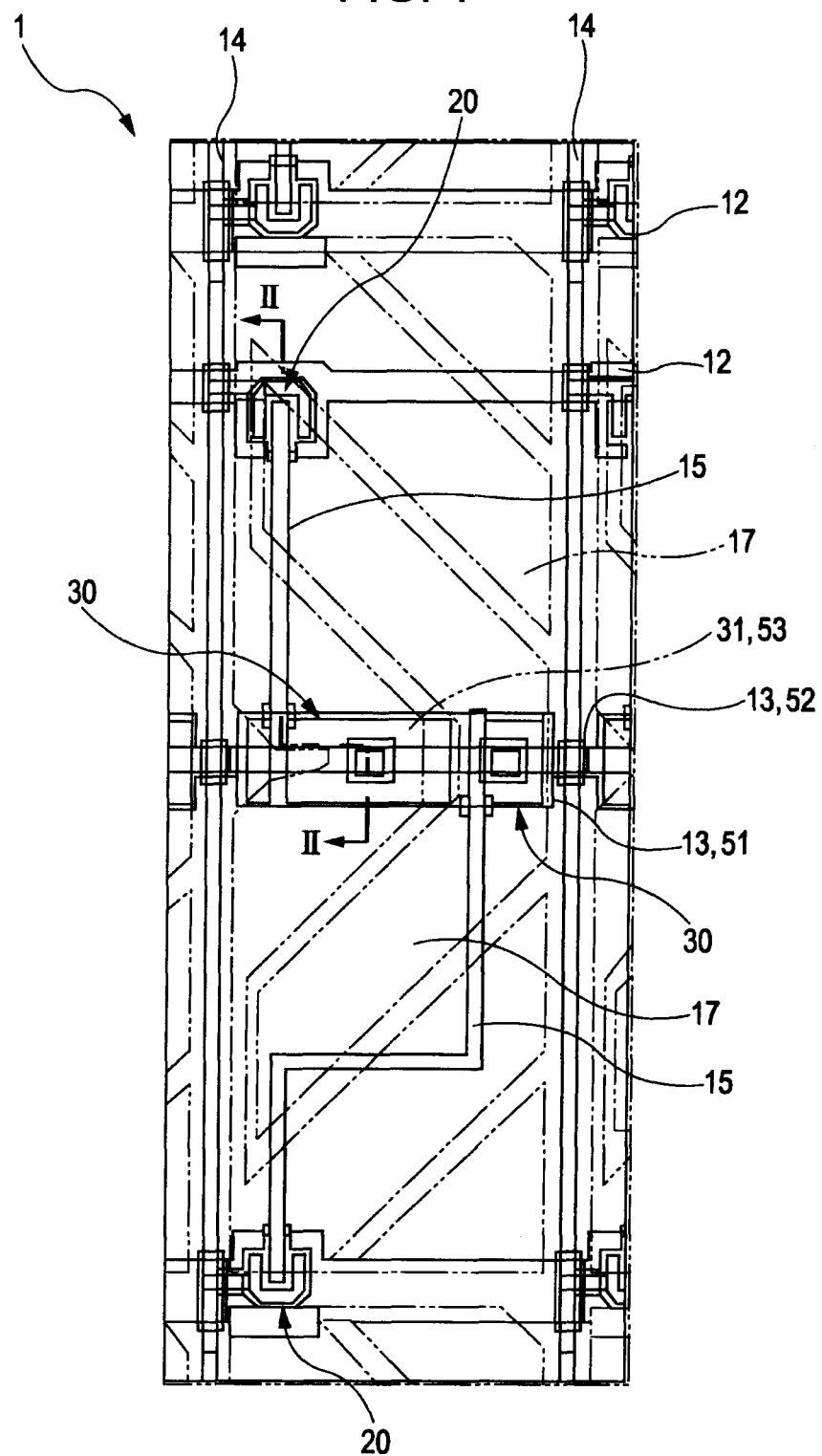
FIG. 1 is a planar layout diagram schematically showing a first configuration example of a liquid-crystal display device according to a first embodiment of the present invention.
Figure 2:
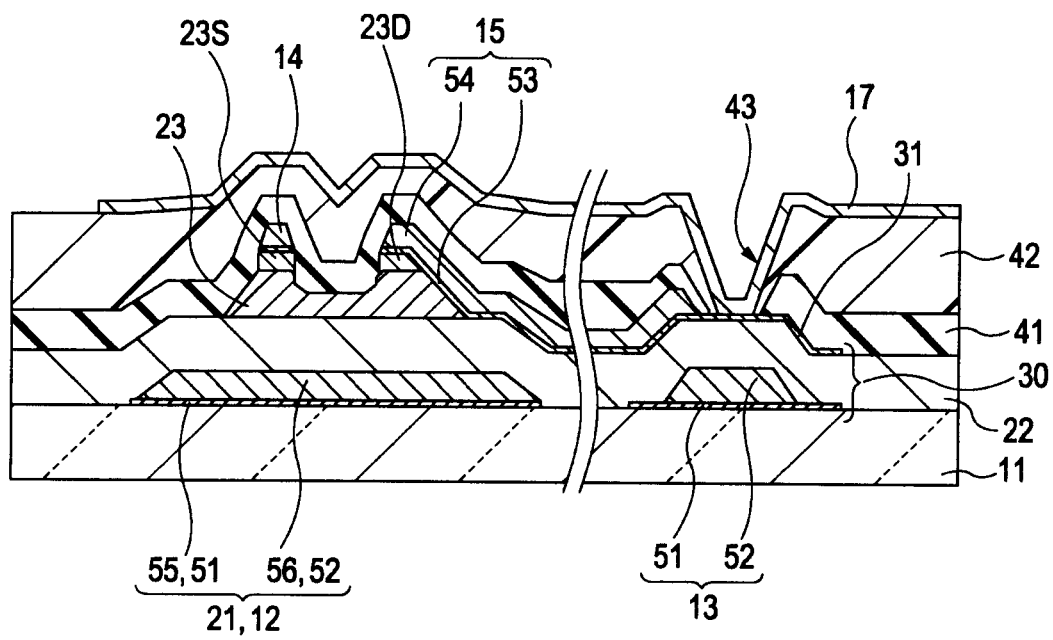
FIG. 2 shows a cross-section diagram taken along II-II in FIG. 1.
Figure 3:
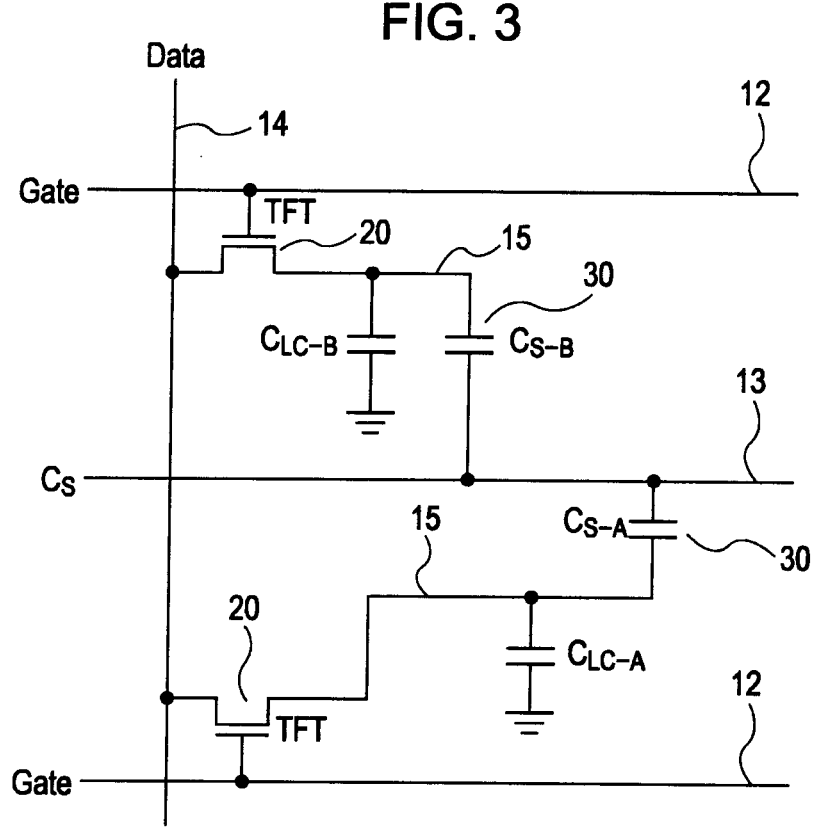
FIG. 3 is an equivalent circuit schematic illustrating the first configuration example of the liquid-crystal display device according to the first embodiment of the present invention.

A first configuration example of a liquid-crystal display device according to a first embodiment of the present invention will be described with reference to FIG. 1 showing a planar layout diagram and FIG. 2 showing a cross-section diagram taken along II-II in FIG. 1. Then, FIG. 3 illustrates an equivalent circuit schematic. For example, an active-matrix-type liquid-crystal display device is shown in FIGS. 1, 2, and 3.

As shown in FIGS. 1 and 2, a plurality of scan lines 12 also functioning as a gate electrode 21 are arranged in a first direction on a substrate 11. For example, examples of the substrate 11 include a glass substrate and a resin substrate. In addition, on the substrate 11, a storage-capacitor main wiring line 13 is arranged between the plurality of scan lines 12 in a direction which is parallel to the first direction. Hereinafter, the storage capacitor main wiring line 13 will be simply referred to as "main wiring line 13".

On the substrate 11, the scan lines 12 including the gate electrode 21 and a gate insulation layer 22 coating the main wiring line 13 are formed. On the gate insulation layer 22 on the gate electrode 21, an active element 23 including a semiconductor layer is formed. A central region of the active element 23 functions as a channel region and the two sides of the active element 23 function as a source region 23S and a drain region 23D, respectively. On the source region 23S, a source wiring line 14 including a source electrode 14E is formed. Then, on the drain region 23D, a drain wiring line 15 including a drain electrode 15D is formed. As described above, a thin-film transistor 20 including the gate electrode 21 is formed.

The plurality of source wiring lines 14 is arranged in a second direction intersecting the first direction.

In addition, a storage capacitor 30 is formed by using the main wiring line 13, the gate insulation layer 22 which is an insulation layer on the main wiring line 13, and an intermediate electrode 31 formed on the gate insulation layer 22. For example, the intermediate electrode 31 is formed by extending a part of the drain wiring line 15.

On the gate insulation layer 22, a passivation layer 41 and an overcoat layer 42 are formed in layers so as to coat the active element 23, the source wiring line 14, the drain wiring line 15, and the intermediate electrode 31. The passivation layer 41 is formed with, for example, a silicon nitride layer, and the overcoat layer 42 is formed with, for example, an acrylic resin.

In the overcoat 42 and the passivation layer 41, a contact hole 43, reaching the intermediate electrode 31, is formed. Furthermore, a picture-element electrode 17, connected to the intermediate electrode 31, is formed on the overcoat layer 42.

The main wiring line 13 includes a first transparent electrode 51, the first transparent electrode 51 being island shaped and having an area of a size used for forming a storage capacitor, and a first metallic wiring line 52 arranged in the first direction on the first transparent electrode 51, the first metallic wiring line 52 being smaller in width and having a lower electrical resistance than the first transparent electrode 51. For example, indium tin oxide (ITO), zinc oxide, aluminum-doped zinc oxide, or indium zinc oxide is used for the first transparent electrode 51. In addition, for example, the first metallic wiring line 52 is formed with aluminum or aluminum alloy such as aluminum-molybdenum alloy or aluminum-titanium alloy. Regarding a relation between the first transparent electrode 51 and the first metallic wiring line 52, it is possible to form the first metallic wiring line 52 on the first transparent electrode 51 as described above or, conversely, to form the first transparent electrode 51 on the first metallic wiring line 52. From a productivity standpoint, it is desirable to form the first metallic wiring line 52 on the first transparent electrode 51 so that a halftone lithographic exposure described hereinafter may be used. Since the halftone lithographic exposure described hereinafter prevents an increase in the number of masks, it is possible to increase productivity further.

The drain wiring line 15 includes a second transparent electrode 53 and a second metallic wiring line 54 formed on the second transparent electrode 53, the second metallic wiring line 54 being smaller in width and having a lower electrical resistance than the second transparent electrode 53. For example, indium tin oxide (ITO), zinc oxide, aluminum-doped zinc oxide, or indium zinc oxide is used for the second transparent electrode 53. In addition, for example, the second metallic wiring line 54 is formed with aluminum or aluminum alloy such as aluminum-molybdenum alloy or aluminum-titanium alloy. Regarding a relation between the second transparent electrode 53 and the second metallic wiring line 54, it is possible to form the second metallic wiring line 54 on the second transparent electrode 53 as described above or, conversely, to form the second transparent electrode 53 on the second metallic wiring line 54. From a productivity standpoint, it is desirable to form the second metallic wiring line 54 on the second transparent electrode 53 so that the halftone lithographic exposure described hereinafter may be used. Since the halftone lithographic exposure described hereinafter prevents an increase in the number of masks, it is possible to increase productivity further.

The scan line 12 includes a third transparent electrode 55, formed with the same layer as that used for the first transparent electrode 51, and a third metallic wiring line 56 formed on the third transparent electrode 55, the third metallic wiring line 56 being smaller in width and having a lower electrical resistance than the third transparent electrode 55. The third metallic wiring line 56 is formed with the same layer as that used for the first metallic wiring line 52.

Then, the intermediate electrode 31 is formed by extending the second transparent electrode 53 included in the drain wiring line 15 and includes an island-shaped pattern having an area of a size used for forming a storage capacitor. Accordingly, the intermediate electrode 31 includes the second transparent electrode 53. By using the halftone lithographic exposure, the intermediate electrode 31 and drain wiring line 15 are formed simultaneously.

Therefore, a capacitance value of the storage capacitor 30 is determined on the basis of the area of a facing pattern between the first transparent electrode 51 included in the main wiring line 13 and the intermediate electrode 31.

In addition, it is possible to form a storage capacitor by using the scan line 12, the picture-element electrode 17, and an insulation layer, formed between the scan line 12 and picture-element electrode 17, such as the gate insulation layer 22, the passivation layer 41, or the overcoat layer 42.

Then, FIG. 3 illustrates an equivalent circuit of the liquid-crystal display device 1. In the equivalent circuit, "Gate" is the scan line 12, "$C_S$" the main wiring line 13, and "Data" the source wiring line 14. Then, "$C_{S-A}$" and "$C_{S-B}$" are respectively storage capacitors 30 of a divisional picture element A and a divisional picture element B, and "$C_{LC-A}$" and "$C_{LC-B}$" are respectively liquid-crystal capacitors of the divisional picture elements A and B. Also, "TFT" is the thin-film transistor 20.

In the liquid-crystal display device 1, the main wiring line 13 includes the first transparent electrode 51 and the first metallic wiring line 52 which is smaller in width and has a lower electrical resistance than the first transparent electrode 51. Therefore, a portion of the first transparent electrode 51, not covered with the first metallic wiring line 52, enables an aperture ratio of a picture element to become high. Then, the drain wiring line 15 includes the second transparent electrode 53 and the second metallic wiring line 54 which is smaller in width and has a lower electrical resistance than the second transparent electrode 53. Therefore, a portion of the second transparent electrode 53, not covered with the second metallic wiring line 54, enables an aperture ratio of a picture element to become high. Accordingly, the liquid-crystal display device 1 enables luminance and contrast to become high. Furthermore, an ensured area of the first transparent electrode 51 keeps a capacitance value of the storage capacitor 30 from decreasing, the storage capacitor 30 being formed by using the main wiring line 13 and intermediate electrode 31. In addition, since the first metallic wiring line 52 is formed on the first transparent electrode 51, increase of wiring resistance of the main wiring line 13 is suppressed. Then, since the second metallic wiring line 54 is formed on the second transparent electrode 53, increase of wiring resistance of the drain wiring line 15 is suppressed.

Second Embodiment

Second Configuration Example of Liquid-Crystal Display Device

Figure 4:
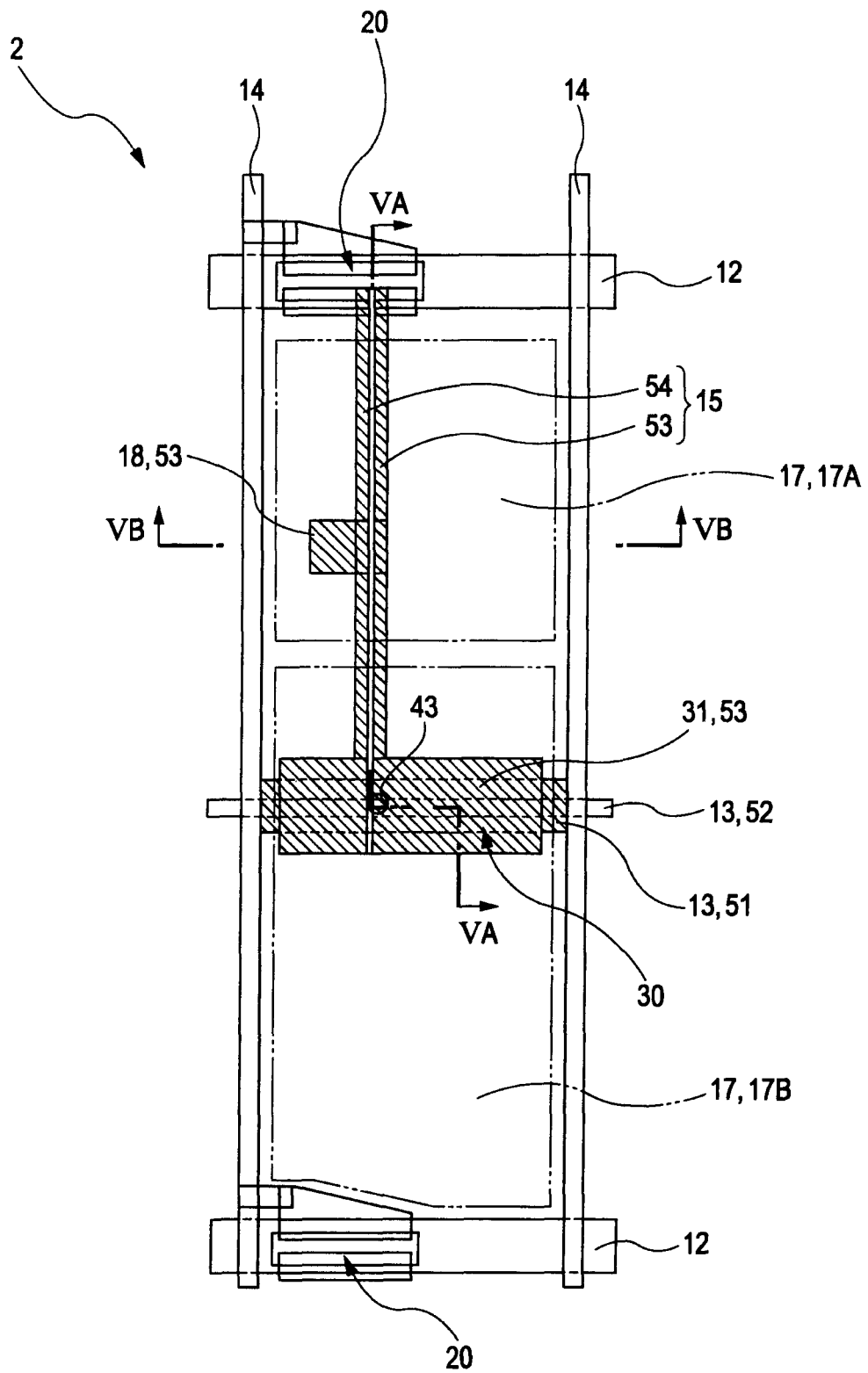
FIG. 4 is a planar layout diagram schematically showing a second configuration example of a liquid-crystal display device according to a second embodiment of the present invention.
Figure 5A:
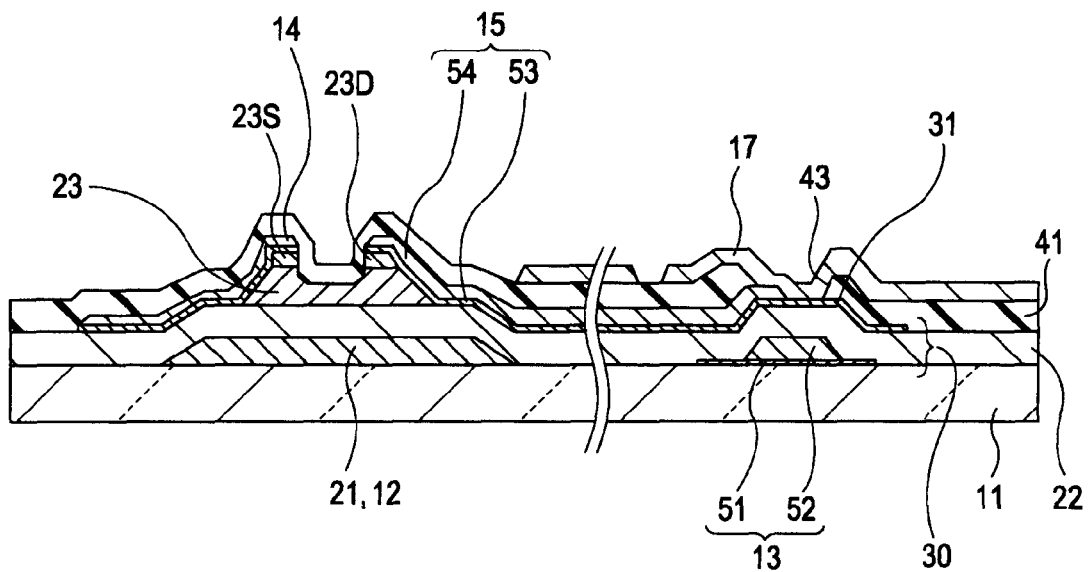
FIGS. 5A and 5B show a cross-section diagram taken along VA-VA and a cross-section diagram taken along VB-VB in FIG. 4, respectively.
Figure 5B:
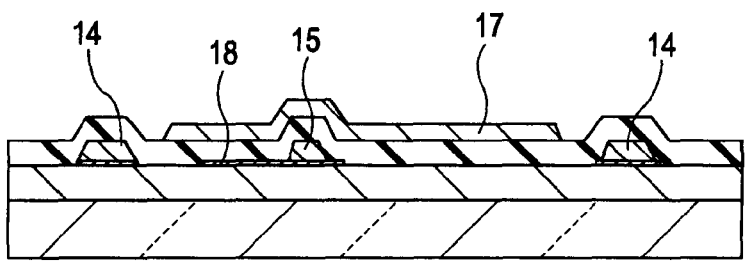
Figure 6:
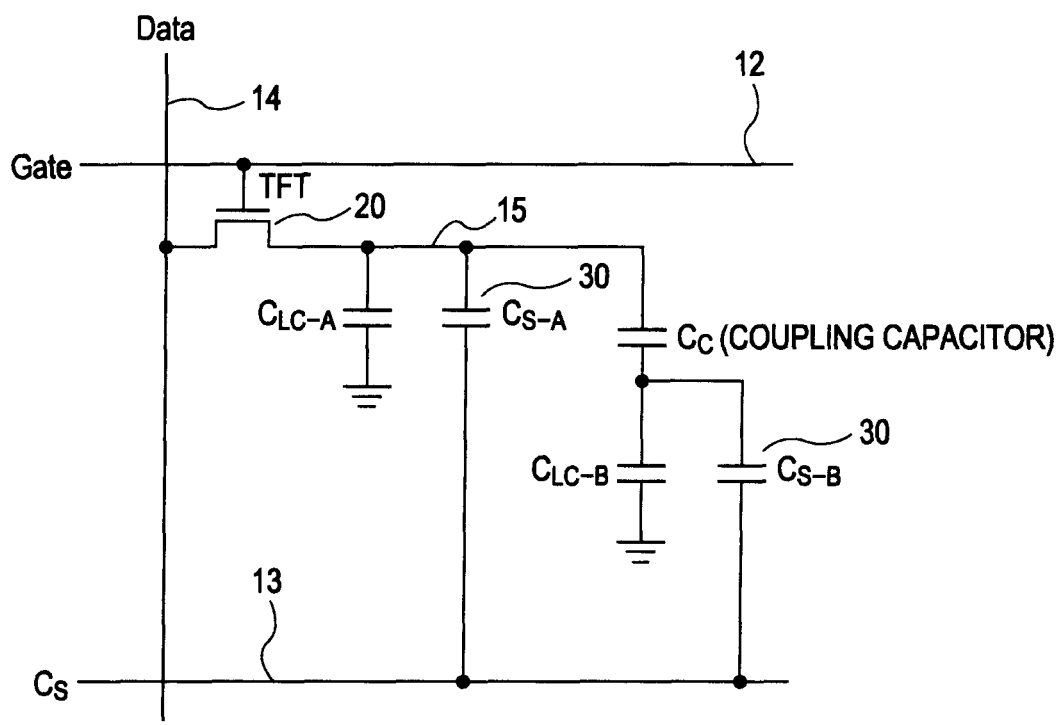
FIG. 6 is an equivalent circuit schematic illustrating the second configuration example of the liquid-crystal display device according to the second embodiment of the present invention.

Next, a second configuration example of a liquid-crystal display device according to a second embodiment of the present invention will be described with reference to FIG. 4 showing a planar layout diagram and FIGS. 5A and 5B showing a cross-section diagram taken along VA-VA and a cross-section diagram taken along VB-VB in FIG. 4 respectively. Then, FIG. 6 illustrates an equivalent circuit schematic. For example, in FIGS. 4, 5A, 5B, and 6, an active-matrix-type liquid-crystal display device is shown.

As shown in FIGS. 4, 5A, and 5B, a plurality of scan lines 12 also functioning as a gate electrode 21 are arranged in a first direction on a substrate 11. For example, the substrate 11 includes a glass substrate or a resin substrate. In addition, on the substrate 11, a storage-capacitor main wiring line 13 is arranged between the plurality of scan lines 12 in a direction which is parallel to the first direction. Hereinafter, the storage capacitor main wiring line 13 will be simply referred to as "main wiring line 13".

On the substrate 11, the scan lines 12 including the gate electrode 21 and a gate insulation layer 22 coating the main wiring line 13 are formed. On the gate insulation layer 22 on the gate electrode 21, an active element 23 including a semiconductor layer is formed. A central region of the active element 23 functions as a channel region and the two sides of the active element 23 function as a source region 23S and a drain region 23D, respectively. On the source region 23S, a source wiring line 14 including a source electrode 14E is formed. Then, on the drain region 23D, a drain wiring line 15 including a drain electrode 15D is formed. As described above, a thin-film transistor 20 including the gate electrode 21 is formed.

The plurality of source wiring lines 14 is arranged in a second direction intersecting the first direction.

In addition, a storage capacitor 30 is formed by using the main wiring line 13, the gate insulation layer 22 which is an insulation layer on the main wiring line 13, and an intermediate electrode 31 formed on the gate insulation layer 22. For example, the intermediate electrode 31 is formed by extending a part of the drain wiring line 15.

On the gate insulation layer 22, a passivation layer 41 is formed so as to coat the active element 23, the source wiring line 14, the drain wiring line 15, and the intermediate electrode 31. The passivation layer 14 is formed with, for example, a silicon nitride layer.

In the passivation layer 41, a contact hole 43, reaching the intermediate electrode 31, is formed. A picture-element electrode 17, connected to the intermediate electrode 31, is formed on the passivation layer 41. The picture-element electrode 17 includes an electrode 17A of a picture element A and an electrode 17B of a picture element B and is arranged, by a combination of the electrode 17A and electrode 17B, between the source wiring lines 14 and between the scan lines 12.

The main wiring line 13 includes a first transparent electrode 51, the first transparent electrode 51 being island shaped and having an area of a size used for forming a storage capacitor, and a first metallic wiring line 52 arranged in the first direction on the first transparent electrode 51, the first metallic wiring line 52 being smaller in width and having a lower electrical resistance than the first transparent electrode 51. For example, indium tin oxide (ITO), zinc oxide, aluminum-doped zinc oxide, or indium zinc oxide is used for the first transparent electrode 51. In addition, for example, the first metallic wiring line 52 is formed with aluminum or aluminum alloy such as aluminum-molybdenum alloy or aluminum-titanium alloy. Regarding a relation between the first transparent electrode 51 and the first metallic wiring line 52, it is possible to form the first metallic wiring line 52 on the first transparent electrode 51 as described above or, conversely, to form the first transparent electrode 51 on the first metallic wiring line 52. From a productivity standpoint, it is desirable to form the first metallic wiring line 52 on the first transparent electrode 51 so that a halftone lithographic exposure described hereinafter may be used. Since the halftone lithographic exposure described hereinafter prevents an increase in the number of masks, it is possible to increase productivity further.

The drain wiring line 15 includes a second transparent electrode 53 and a second metallic wiring line 54 formed on the second transparent electrode 53, the second metallic wiring line 54 being smaller in width and having a lower electrical resistance than the second transparent electrode 53. For example, indium tin oxide (ITO), zinc oxide, aluminum-doped zinc oxide, or indium zinc oxide is used for the second transparent electrode 53. In addition, for example, the second metallic wiring line 54 is formed with aluminum or aluminum alloy such as aluminum-molybdenum alloy or aluminum-titanium alloy. Regarding a relation between the second transparent electrode 53 and the second metallic wiring line 54, it is possible to form the second metallic wiring line 54 on the second transparent electrode 53 as described above or, conversely, to form the second transparent electrode 53 on the second metallic wiring line 54. From a productivity standpoint, it is desirable to form the second metallic wiring line 54 on the second transparent electrode 53 so that the halftone lithographic exposure described hereinafter may be used. Since the halftone lithographic exposure described hereinafter prevents an increase in the number of masks, it is possible to increase productivity further.

A control electrode 18 is contiguously formed in the middle of the drain wiring line 15. For example, the control electrode 18 is formed by making the second transparent electrode 53 included in the drain wiring line 15 protrude. Accordingly, the control electrode 18 is formed with the second transparent electrode 53. Therefore, a coupling capacitor is formed by using the drain wiring line 15 and control electrode 18, the picture-element electrode 17, and an insulation layer, formed between the drain wiring line 15 and control electrode 18 and the picture-element electrode 17, such as the passivation layer 41.

The scan line 12 is formed with a third metallic wiring line 56. The third metallic wiring line 56 is formed with the same layer as that used for the first metallic wiring line 52. In addition, not shown, when the scan line 12 is formed concurrently with the main wiring line 13, the scan line 12 includes a third transparent electrode, formed with the same layer as that used for the first transparent electrode 51, and the third metallic wiring line 56 formed on the third transparent electrode, the third metallic wiring line 56 having a lower electrical resistance than the third transparent electrode.

Then, the intermediate electrode 31 is formed by extending the second transparent electrode 53 included in the drain wiring line 15 and includes an island-shaped pattern having an area of a size used for forming a storage capacitor. Accordingly, the intermediate electrode 31 includes the second transparent electrode 53. By using the halftone lithographic exposure, the intermediate electrode 31 and drain wiring line 15 are formed simultaneously.

Therefore, a capacitance value of the storage capacitor 30 is determined on the basis of the area of a facing pattern between the first transparent electrode 51 included in the main wiring line 13 and the intermediate electrode 31.

In addition, it is possible to form a storage capacitor by using the scan line 12, the picture-element electrode 17, an insulation layer, formed between the scan line 12 and the picture-element electrode 17, such as the gate insulation layer 22 or the passivation layer 41. In the same way, it is possible to form a storage capacitor by using the main wiring line 13, the picture-element electrode 17, an insulation layer, formed between the main wiring line 13 and the picture-element electrode 17, such as the gate insulation layer 22 or the passivation layer 41.

Then, FIG. 6 illustrates an equivalent circuit of the liquid-crystal display device 2. In the equivalent circuit, "Gate" is the scan line 12, "$C_S$" the main wiring line 13, and "Data" the source wiring line 14. Then, "$C_{S-A}$" and "$C_{S-B}$" are respectively storage capacitors 30 of a divisional picture element A and a divisional picture element B, and "$C_{LC-A}$" and "$C_{LC-B}$" are respectively liquid-crystal capacitors of the divisional picture elements A and B. Furthermore, "$C_C$" is the coupling capacitor. Then, "TFT" is the thin-film transistor 20.

In the liquid-crystal display device 2, the main wiring line 13 includes the first transparent electrode 51 and the first metallic wiring line 52 which is smaller in width and has a lower electrical resistance than the first transparent electrode 51. Therefore, a portion of the first transparent electrode 51, not covered with the first metallic wiring line 52, enables an aperture ratio of a picture element to become high. Then, the drain wiring line 15 includes the second transparent electrode 53 and the second metallic wiring line 54 which is smaller in width and has a lower electrical resistance than the second transparent electrode 53. Therefore, a portion of the second transparent electrode 53, not covered with the second metallic wiring line 54, enables an aperture ratio of a picture element to become high. Furthermore, in a capacitive coupling method, while the control electrode 18, which deteriorates an aperture ratio, is additionally provided, the second transparent electrode 53 included in the control electrode 18 has the effect of increasing an aperture ratio of a picture element. Accordingly, the liquid-crystal display device 2 enables luminance and contrast to become high. Furthermore, an ensured area of the first transparent electrode 51 keeps a capacitance value of the storage capacitor 30 from decreasing, the storage capacitor 30 being formed by using the main wiring line 13 and intermediate electrode 31. In addition, since the first metallic wiring line 52 is formed on the first transparent electrode 51, increase of wiring resistance of the main wiring line 13 is suppressed. Then, an ensured area of the second transparent electrode 53 keeps a capacitance value of the coupling capacitor from decreasing. In addition, since the second metallic wiring line 54 is formed on the second transparent electrode 53, increase of wiring resistance of the drain wiring line 15 is suppressed.

Halftone Lithographic Exposure Process

Next, a halftone lithographic exposure process will be described with reference to production-process diagrams shown in FIGS. 7A to 7F. FIGS. 7A to 7F show an example of forming the scan line 12, including the gate electrode 22, and the main wiring line 13. In addition, the halftone lithographic exposure process may be applied to a forming process of the drain wiring line 15 and intermediate electrode 31 and a forming process of the drain wiring line 15 and control electrode 18.

Figure 7:
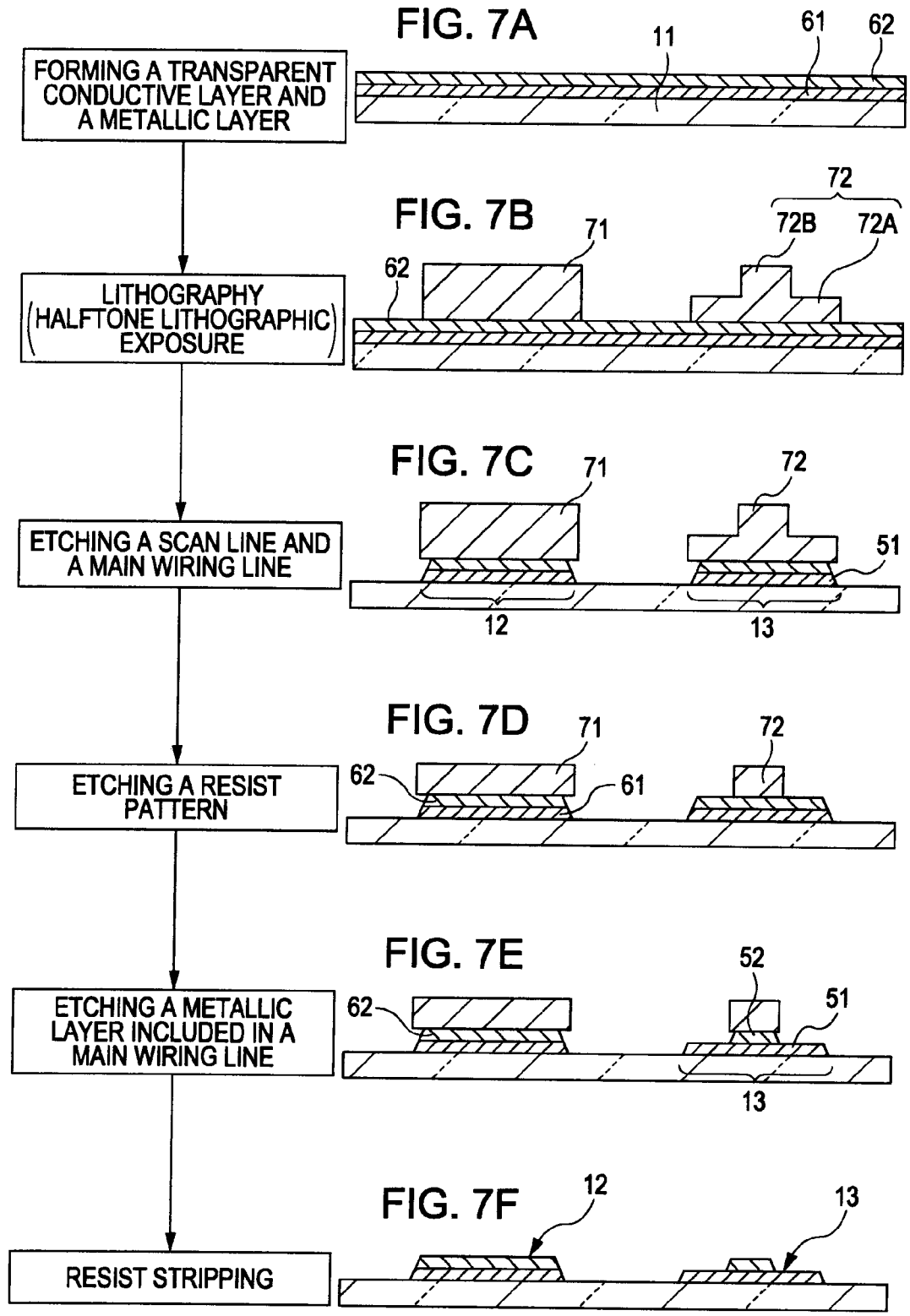
FIGS. 7A to 7F are production-process diagrams schematically showing an example of a halftone lithographic exposure process.

As shown in FIG. 7A, a layer-forming process of a transparent conductive layer and a metallic layer is performed. In the process, a transparent conductive layer 61 and a metallic layer 62 are sequentially formed in layers on the substrate 11. For example, the substrate 11 includes a glass substrate or a resin substrate. For example, indium tin oxide (ITO), zinc oxide, aluminum-doped zinc oxide, or indium zinc oxide is used for the transparent conductive layer 61. In addition, for example, the metallic layer 62 is formed with aluminum or aluminum alloy such as aluminum-molybdenum alloy or aluminum-titanium alloy.

Next, as shown in FIG. 7B, lithography (halftone lithographic exposure) process is performed. In the process, a resist pattern 71, used for forming a scan line including a gate electrode, and a resist pattern 72, used for forming the main wiring line (storage capacitor main wiring line) 13, are formed on the metallic layer 62. By using a halftone mask, the resist pattern 72 is formed in a stepped shape so that the metallic layer 62 may be etched and made smaller in width than the transparent conductive layer 61. Namely, the resist pattern 72 includes a lower resist pattern 72A used for etching the transparent conductive layer 61 and an upper resist pattern 72B used for etching the metallic layer 62, the upper resist pattern 72B being smaller in width than the lower resist pattern 72A.

Next, as shown in FIG. 7C, an etching process of a scan line and a main wiring line is performed. In the process, by using the resist patterns 71 and 72 as an etching mask, the metallic layer 62 and transparent conductive layer 61 are etched, so that the scan line 12 and the first transparent electrode 51 included in the main wiring line 13 are formed. At this time, the metallic layer 62 included in the main wiring line 13 is formed in almost the same size as the first transparent electrode 51. In addition, usually by adjusting an etching condition, the scan line and main wiring line are formed so that the cross-section surfaces may have tapered shapes as shown in FIG. 7C.

Next, as shown in FIG. 7D, an etching process of a resist pattern is performed. In the process, by using dry etching, for example, the layer thickness of the resist pattern 72 is decreased over the whole surface, so that a certain thickness of the layer, corresponding to the resist-layer thickness of the lower resist pattern 72A, is stripped away and only the protruding portion of the upper resist pattern 72B (refer to the FIG. 7C) remains. Therefore, the resist pattern 72 becomes smaller in width than the first transparent electrode 51. Also, while the layer thickness of the resist pattern 71 is decreased in the etching process of the resist pattern, the layer thickness of the resist pattern 71 is preserved so as to keep the metallic layer 62 and transparent conductive layer 61, coated with the resist pattern 71, from being etched.

Next, as shown in FIG. 7E, an etching process of a metallic layer included in the main wiring line is performed. In the process, by using the resist patterns 71 and 72 as an etching mask, the metallic layer 62 included in a main wiring line part is etched, so that the first metallic wiring line 52 included in the main wiring line 13 is formed.

Next, as shown in FIG. 7F, a resist stripping process is performed. In the process, the resist patterns 71 and 72 (refer to the FIG. 7E) are stripped away. Now, the process of forming the scan line 12 and main wiring line 13 with the halftone lithographic exposure is completed.

Since the wiring-line forming process with the halftone lithographic exposure prevents an increase in the number of masks, it is possible to increase productivity further. In addition, the halftone lithographic exposure process may be applied to a forming process of the drain wiring line 15 and intermediate electrode 31 and a forming process of the drain wiring line 15 and control electrode 18.

Examples of Applications of Liquid-Crystal Display Device according to Embodiments of the Present Invention The above-described liquid-crystal display devices 1 and 2 according to embodiments of the present invention can be applied to a variety of electronics devices shown in FIGS. 8 to 12G. For example, the variety of electronics devices include a digital camera, a laptop computer, a mobile terminal device such as a mobile phone, and a video camera. Namely, the liquid-crystal display devices 1 and 2 can be applied to liquid-crystal display devices included in all kinds of electronics devices for displaying, as a picture image or a video, a video signal input to or generated in an electronics device. Examples of electronics devices to which the liquid-crystal display devices 1 and 2 are applied will hereinafter be described.

Also, examples of the liquid-crystal display devices 1 and 2 include a module-type device with a sealing structure. For example, a display module corresponds to the module-type device, the display module being formed, in a picture-element array section, by being pasted on a facing section such as transparent glass. A color filter, a protective layer, or a light blocking layer might be formed on the transparent facing section. In addition, a circuit section, for inputting a signal from the outside to the picture-element array section or outputting a signal to the outside therefrom, or a FPC (flexible printed circuit) might be provided in the display module.

Television Device

Figure 8:
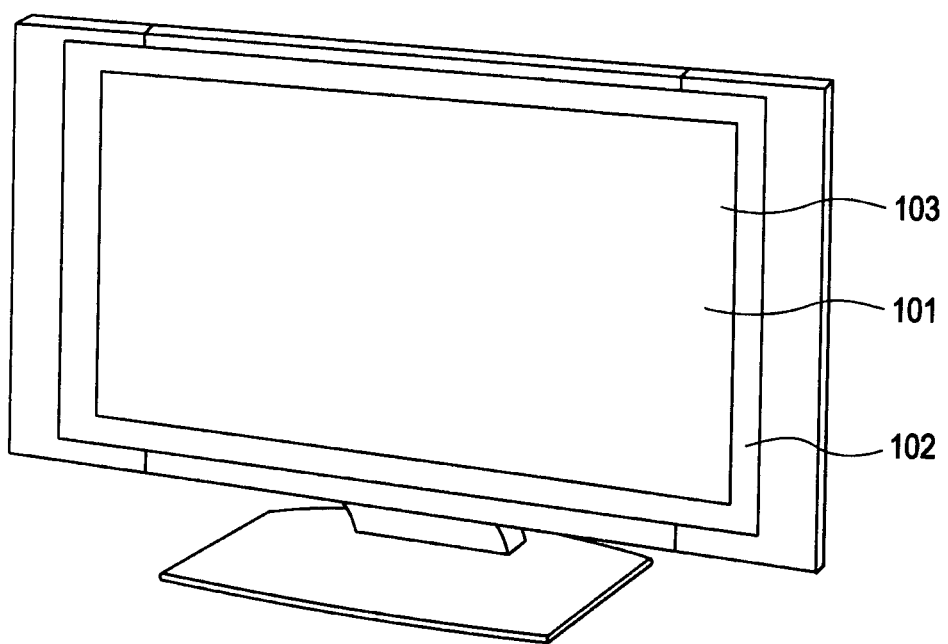
FIG. 8 is a diagrammatic perspective view schematically showing a television device to which the liquid-crystal display device is applied.

First, a television device, to which the liquid-crystal display device 1 or 2 is applied, will be described with reference to a diagrammatic perspective view shown in FIG. 8. As shown in FIG. 8, the television device, to which the liquid-crystal display device 1 or 2 is applied, includes a video display screen section 101 including a front panel 102 and a filter glass 103. Furthermore, the television device is manufactured by using the liquid-crystal display device 1 or 2 as the video display screen section 101.

Digital Camera

Figure 9A:
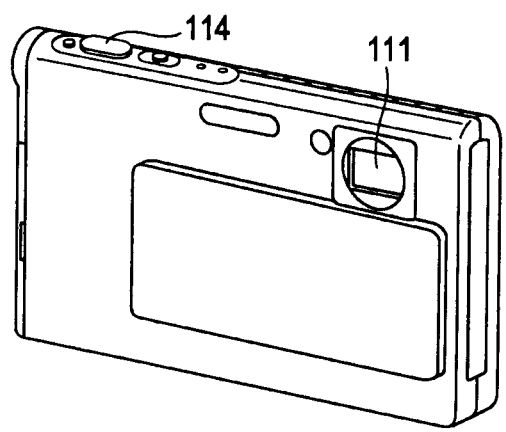
FIGS. 9A and 9B are diagrammatic perspective views schematically showing a digital camera to which the liquid-crystal display device is applied.
Figure 9B:
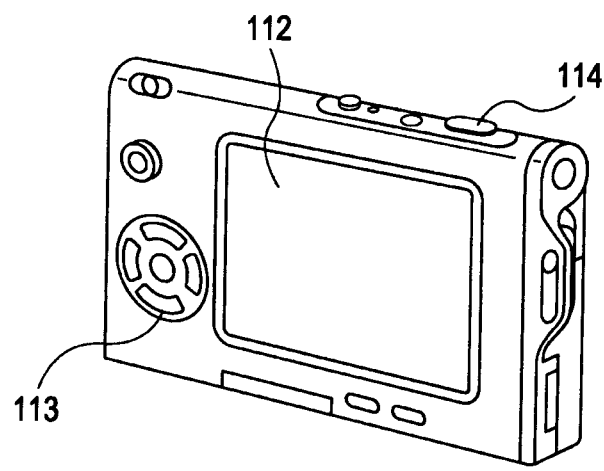

Next, a digital camera, to which the liquid-crystal display device 1 or 2 is applied, will be described with reference to diagrammatic perspective views shown in FIGS. 9A and 9B. FIG. 9A shows a diagrammatic perspective view from an obverse side and FIG. 9B a diagrammatic perspective view from a reverse side. As shown in FIGS. 9A and 9B, the digital camera, to which the liquid-crystal display device 1 or 2 is applied, includes a light-emitting section 111 for photoflash, a display section 112, a menu switch 113, and a shutter button 114. In addition, the digital camera is manufactured by using the liquid-crystal display device 1 or 2 as the display section 112.

Laptop Computer

Figure 10:
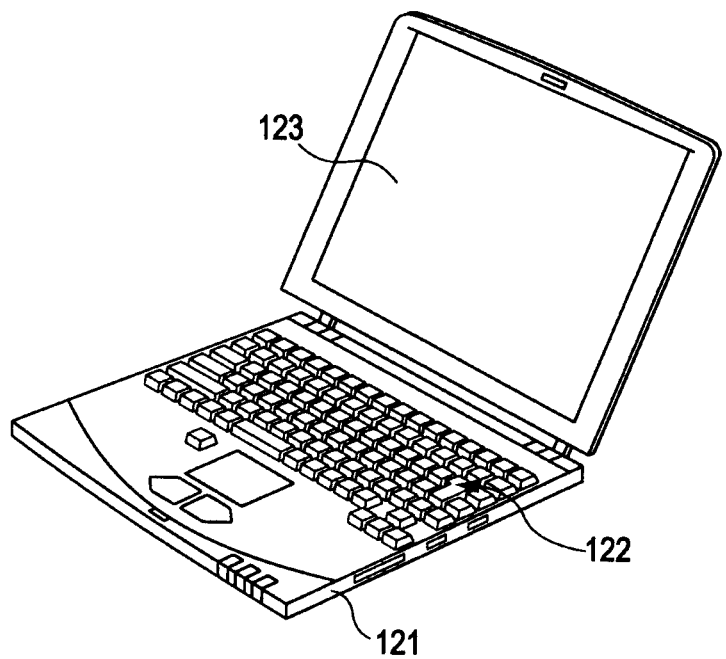
FIG. 10 is a diagrammatic perspective view schematically showing a laptop computer to which the liquid-crystal display device is applied.

Next, a laptop computer, to which the liquid-crystal display device 1 or 2 is applied, will be described with reference to a diagrammatic perspective view shown in FIG. 10. As shown in FIG. 10, the laptop computer, to which the liquid-crystal display device 1 or 2 is applied, includes, in a main unit 121, a keyboard 122 operated to input characters and a display section 123 for displaying a picture image. The laptop computer is manufactured by using the liquid-crystal display device 1 or 2 as the display section 123.

Video Camera

Figure 11:
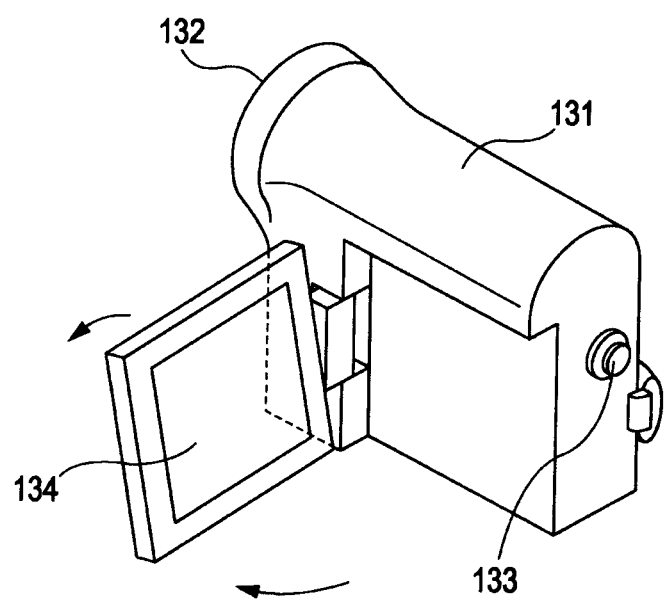
FIG. 11 is a diagrammatic perspective view schematically showing a video camera to which the liquid-crystal display device is applied.

Next, a video camera, to which the liquid-crystal display device 1 or 2 is applied, will be described with reference to a diagrammatic perspective view shown in FIG. 11. As shown in FIG. 11, the video camera, to which the liquid-crystal display device 1 or 2 is applied, includes a main unit 131, a shooting lens 132 provided on the front face, a start/stop switch 133 for shooting, and a display section 134. The video camera is manufactured by using the liquid-crystal display device 1 or 2 as the display section 134.

Mobile Terminal Device

Figure 12E:
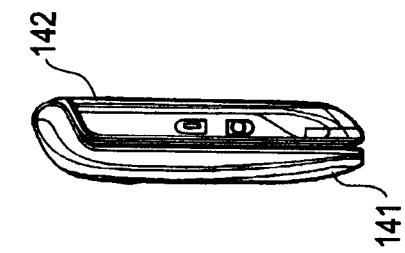
FIGS. 12A to 12G are diagrams schematically showing a mobile terminal device to which the liquid-crystal display device is applied.
Figure 12F:
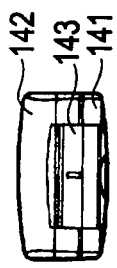
Figure 12C:
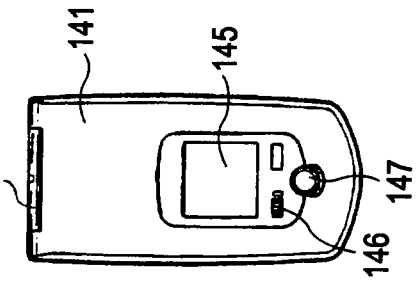
Figure 12G:
Figure 12D:
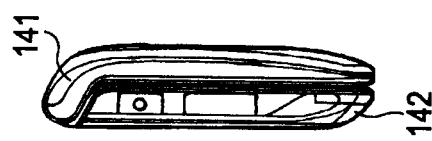
Figure 12B:
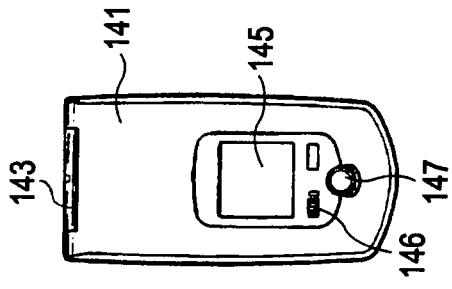
Figure 12A:
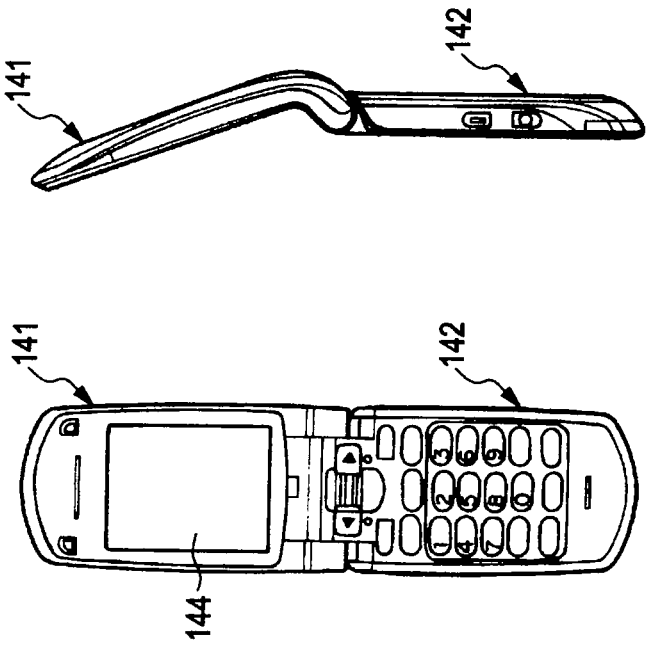
Figure 13:
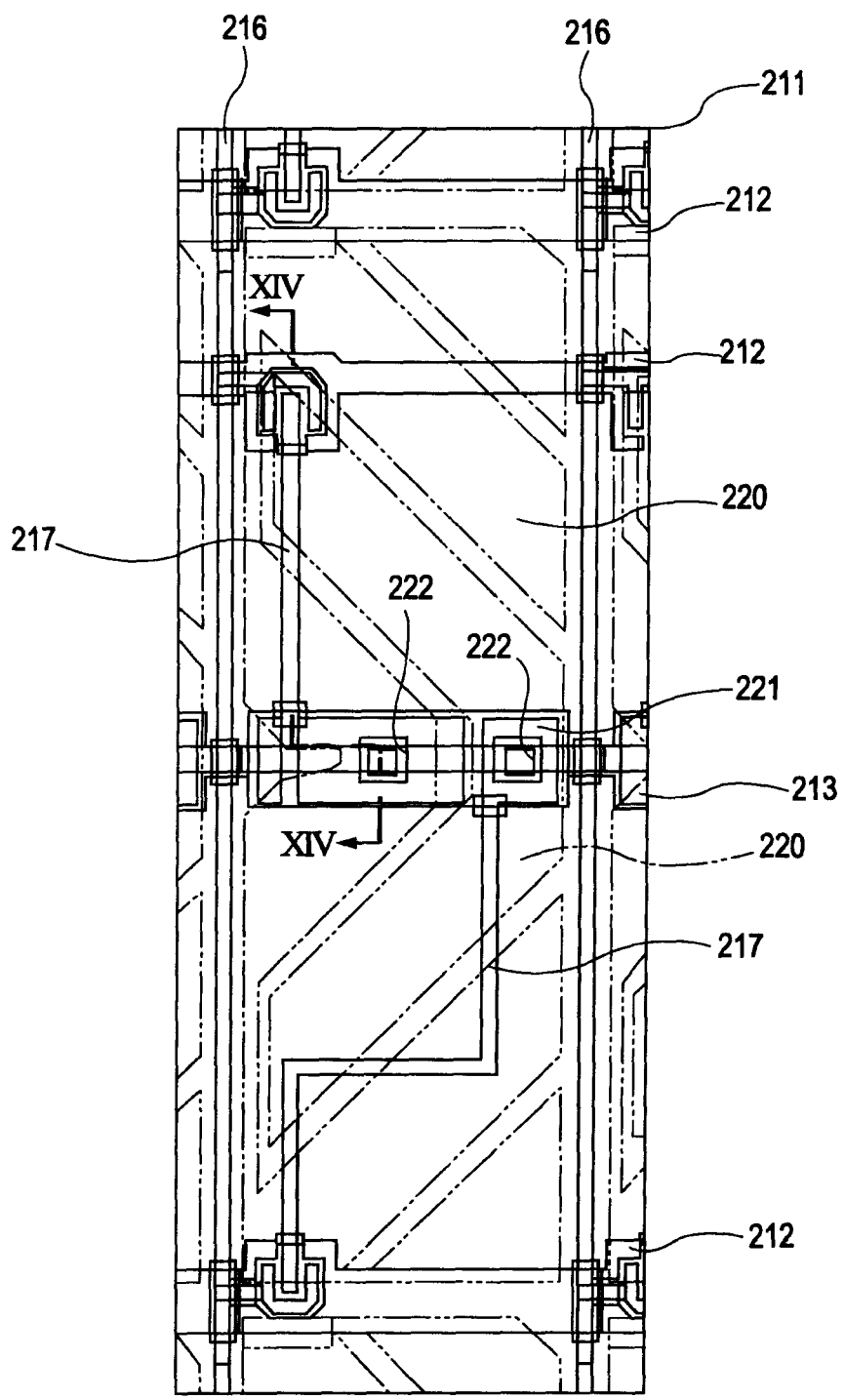
FIG. 13 is a planar layout diagram schematically showing a configuration example of a related liquid-crystal display device.
Figure 14:
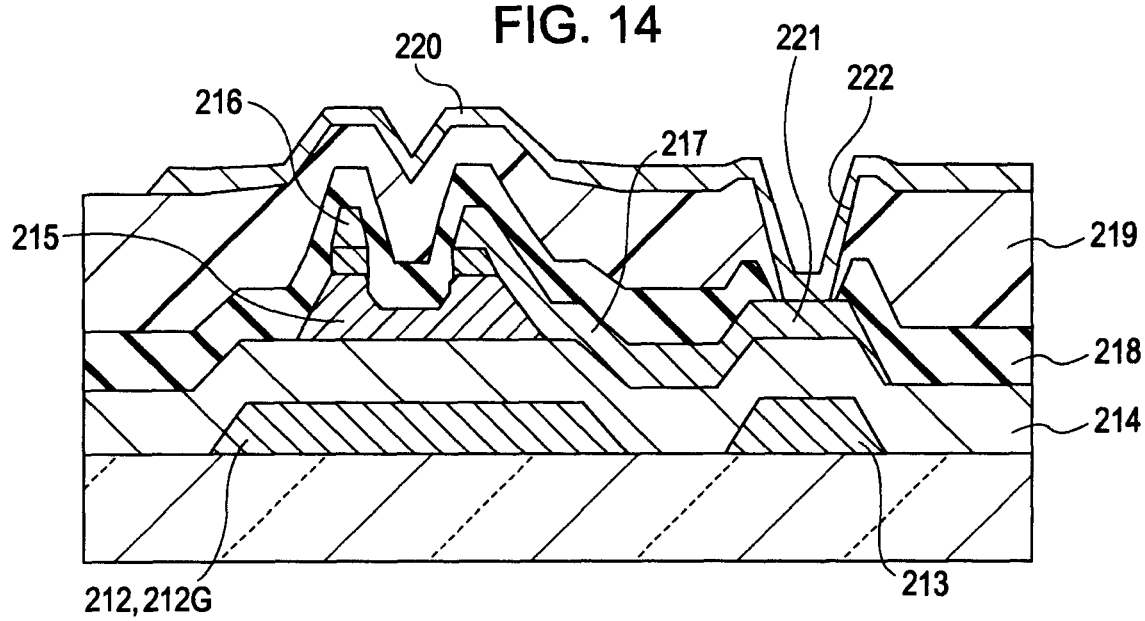
FIG. 14 shows a cross-section diagram taken along XIV-XIV in FIG. 13.
Figure 15:
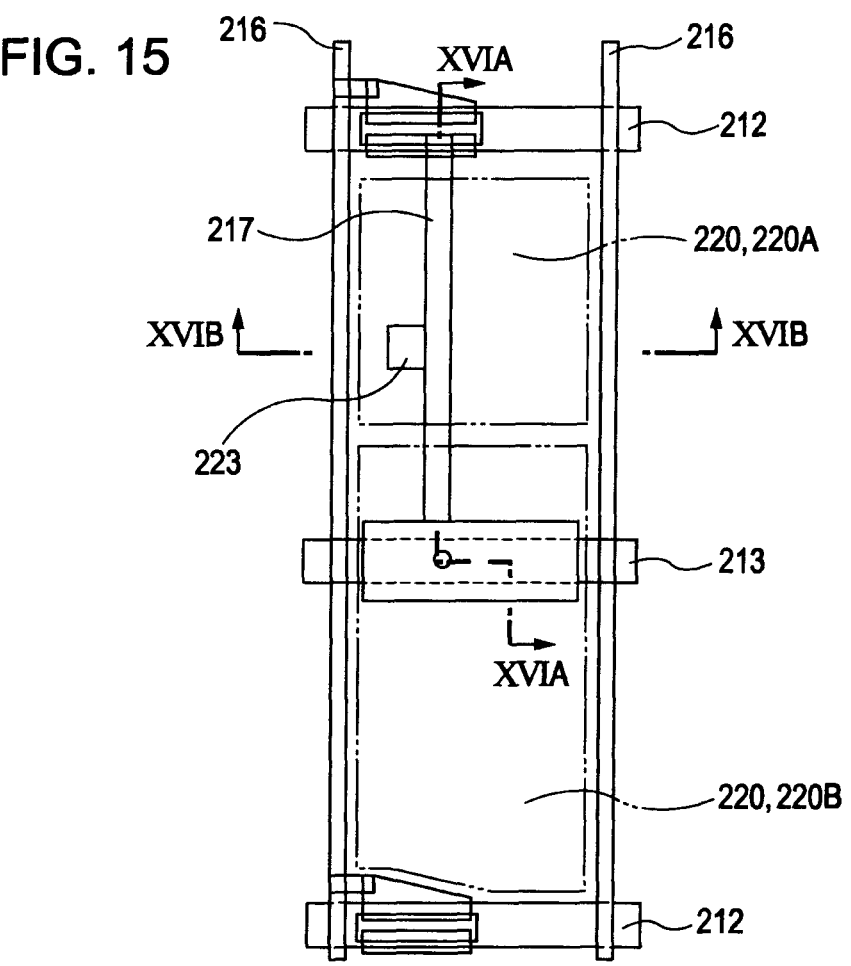
FIG. 15 is a planar layout diagram schematically showing a configuration example of a liquid-crystal display device of the related art (halftone method)
Figure 16A:
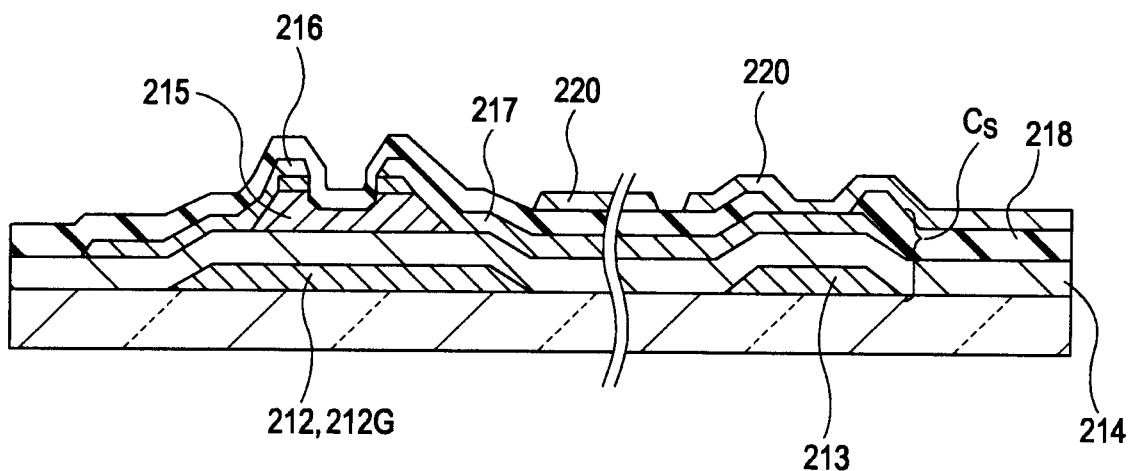
FIGS. 16A and 16B show a cross-section diagram taken along XVIA-XVIA and a cross-section diagram taken along XVIB-XVIB in FIG. 15, respectively.
Figure 16B:
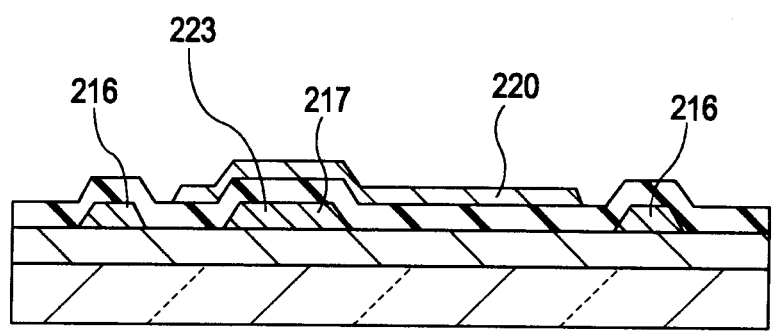

Next, a mobile terminal device such as a mobile phone, to which the liquid-crystal display device 1 or 2 is applied, will be described with reference to FIGS. 12A to 12G. FIG. 12A shows a front view of an unfolded mobile terminal device, FIG. 12B a side view of the unfolded mobile terminal device, FIG. 12C a front view of a folded mobile terminal device, FIG. 12D a left side view of the folded mobile terminal device, FIG. 12E a right side view of the folded mobile terminal device, FIG. 12F a top view of the folded mobile terminal device, and FIG. 12G a bottom view of the folded mobile terminal device. As shown in FIGS. 12A to 12G, the mobile phone, to which the liquid-crystal display device 1 or 2 is applied, includes an upper chassis 141, a lower chassis 142, a joining section (a hinge section, in this case) 143, a display 144, a sub-display 145, a picture light 146, a camera 147. The mobile phone is manufactured by using the liquid-crystal display device 1 or 2 as the display 144 or the sub-display 145.

The present application contains subject matter related to that disclosed in Japanese Priority Patent Application JP 2008-266251 filed in the Japan Patent Office on Oct. 15, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid-crystal display device comprising:
   a plurality of scan lines arranged in a first direction on a substrate and also functioning as a gate electrode;
   a storage-capacitor main wiring line arranged between the plurality of scan lines on the substrate in a direction which is parallel to the first direction;
   a plurality of source wiring lines arranged in a second direction intersecting the first direction;
   a thin-film transistor including the gate electrode;
   a picture-element electrode arranged between the plurality of source wiring lines and between the plurality of scan lines;
   a storage capacitor formed by using the storage-capacitor main wiring line, an insulation layer on the storage-capacitor main wiring line, and an intermediate electrode on the insulation layer; and
   a drain wiring line connected to a drain electrode of the thin-film transistor and the intermediate electrode;
   wherein the storage-capacitor main wiring line includes a first transparent electrode and a first metallic wiring line formed on the first transparent electrode, the first metallic wiring line which is smaller in width and has a lower electrical resistance than the first transparent electrode,
   the drain wiring line includes a second transparent electrode and a second metallic wiring line being smaller in width and having a lower electrical resistance than the second transparent electrode, the intermediate electrode is formed by extending the second transparent electrode, wherein the plurality of scan lines include a third transparent electrode and a third metallic wiring line formed on the third transparent electrode, the third metallic wiring line being smaller in width and having a lower electrical resistance than the third transparent electrode, and an in-pixel storage capacitor is formed by using the scan line, the picture-element electrode, and an insulation layer formed between the scan line and the picture-element electrode.

2. The liquid-crystal display device according to claim 1, wherein the second metallic wiring line is formed on the second transparent electrode.

3. The liquid-crystal display device according to claim 1, wherein an in-pixel storage capacitor is formed by using the storage-capacitor main wiring line, the picture-element electrode, and an insulation layer formed between the storage-capacitor main wiring line and the picture-element electrode.

4. The liquid-crystal display device according to claim 1, further comprising:

a control electrode connected to the drain wiring line;

wherein the control electrode is formed by making the second transparent electrode protrude in the middle of the second transparent electrode.

5. The liquid-crystal display device according to claim 4, wherein a coupling capacitor is formed by using the drain wiring line and control electrode, the picture-element electrode, and an insulation layer formed between the drain wiring line and control electrode and the picture-element electrode.

* * * * *